United States Patent
Prindle et al.

(10) Patent No.: US 11,592,594 B2
(45) Date of Patent: Feb. 28, 2023

(54) SUBSURFACE LITHOLOGICAL MODEL WITH MACHINE LEARNING

(71) Applicant: X Development LLC, Mountain View, CA (US)

(72) Inventors: Kenton Lee Prindle, Austin, TX (US); Artem Goncharuk, Mountain View, CA (US); Neil David Treat, San Jose, CA (US); Kevin Forsythe Smith, Pleasanton, CA (US); Thomas Peter Hunt, Oakland, CA (US); Karen R Davis, Portola Valley, CA (US); Allen Richard Zhao, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/229,391

(22) Filed: Apr. 13, 2021

(65) Prior Publication Data
US 2021/0318465 A1    Oct. 14, 2021

Related U.S. Application Data

(60) Provisional application No. 63/009,311, filed on Apr. 13, 2020.

(51) Int. Cl.
*G01V 99/00*  (2009.01)
*G01V 1/28*  (2006.01)

(52) U.S. Cl.
CPC ............ *G01V 99/005* (2013.01); *G01V 1/282* (2013.01)

(58) Field of Classification Search
CPC .. G01V 99/005; G01V 1/282; G01V 2210/60; G01V 2210/614; G01V 2210/64;
(Continued)

(56) References Cited

U.S. PATENT DOCUMENTS

| | | | | |
|---|---|---|---|---|
| 6,590,519 B2 * | 7/2003 | Miceli | ..................... | G01S 13/89 701/472 |
| 9,219,886 B2 * | 12/2015 | Sooy | ....................... | H04N 7/18 |

(Continued)

FOREIGN PATENT DOCUMENTS

| | | | | |
|---|---|---|---|---|
| WO | WO 2018/217875 | 11/2018 | | |
| WO | WO-2018217875 A1 * | 11/2018 | ............. | G01V 1/282 |

(Continued)

OTHER PUBLICATIONS

PCT International Search Report and Written Opinion in International Appln. No. PCT/US2021/027076, dated Jul. 5, 2021, 13 pages.

*Primary Examiner* — Manuel A Rivera Vargas
*Assistant Examiner* — Yaritza H Perez Bermudez
(74) *Attorney, Agent, or Firm* — Fish & Richardson P.C.

(57) ABSTRACT

This disclosure describes a system and method for generating a subsurface model representing lithological characteristics and attributes of the subsurface of a celestial body or planet. By automatically ingesting data from many sources, a machine learning system can infer information about the characteristics of regions of the subsurface and build a model representing the subsurface rock properties. In some cases, this can provide information about a region using inferred data, where no direct measurements have been taken. Remote sensing data, such as aerial or satellite imagery, gravimetric data, magnetic field data, electromagnetic data, and other information can be readily collected or is already available at scale. Lithological attributes and characteristics present in available geoscience data can be correlated with related remote sensing data using a machine learning model, which can then infer lithological attributes and characteristics for regions where remote sensing data is available, but geoscience data is not.

85 Claims, 5 Drawing Sheets

(58) Field of Classification Search
CPC ....... G01V 2210/665; G01V 2210/673; G01V 1/306; G01V 1/345
See application file for complete search history.

(56) References Cited

U.S. PATENT DOCUMENTS

| | | |
|---|---|---|
| 10,948,626 B2 * | 3/2021 | Massonnat ............ G01V 99/005 |
| 11,255,997 B2 * | 2/2022 | Raterman ................ E21B 41/00 |
| 2009/0319243 A1 * | 12/2009 | Suarez-Rivera ........ E21B 43/00 702/11 |
| 2019/0345815 A1 * | 11/2019 | Mishra ...................... G01V 1/34 |
| 2020/0158898 A1 * | 5/2020 | Le Guern ............... G01V 1/345 |
| 2022/0018982 A1 * | 1/2022 | Rueger ................. G06V 10/761 |

FOREIGN PATENT DOCUMENTS

| | | |
|---|---|---|
| WO | WO 2019/231572 | 12/2019 |
| WO | WO 2019/241062 | 12/2019 |

* cited by examiner

SUBSURFACE LITHOLOGICAL MODEL WITH MACHINE LEARNING

CROSS-REFERENCE TO RELATED APPLICATION

This application claims priority under 35 U.S.C. § 119 to U.S. Provisional Patent Application Ser. No. 63/009,311, filed on Apr. 13, 2020, the contents of which are incorporated by reference herein in their entirety.

TECHNICAL FIELD

This disclosure generally relates to determining subsurface lithological characteristics using both measured geological data, and inferred data based on remote sensing techniques.

BACKGROUND

Traditional exploration results in detailed knowledge of relatively small regions of Earth's subsurface. Often this detailed knowledge requires local sensor data, which has to be manually placed and maintained at location. These sensors then provide relatively low range results.

SUMMARY

This disclosure describes example implementations of systems, computer-readable media, and computer-implemented methods for generating a subsurface model representing lithological characteristics and attributes of a planetary (or celestial) body's subsurface (e.g., the Earth's crust). By automatically ingesting data from many sources, a machine learning system can infer information about the characteristics of one or more regions of the Earth's crust and build a model representing the subsurface lithology. In some cases, this can provide information about a region using inferred data, where no direct measurements have been taken, which can alleviate the need for extensive manual surveys and exploration.

In an example implementation, techniques for generating an at least partially global subsurface model include identifying geoscience data associated with one or more particular regions of a subsurface, where the geoscience data includes information associated with the lithology of the one or more particular regions of the subsurface; identifying remote sensing data associated with the subsurface; correlating the geoscience data with the remote sensing data using at least one machine learning model to determine inferred data representing lithology of one or more regions of the subsurface associated with the remote sensing data where geoscience data is unavailable; generating an at least partially global subsurface model of the subsurface including one or more data layers, each data layer representing at least one geological characteristic of the subsurface; and generating a graphical representation of the at least partially global subsurface model for display at a user interface.

In aspect combinable with the example implementation, the geoscience data includes at least one of: seismic data; wireline logs; drill core data; construction permitting documents; production logs; soil surveys; or technical reports.

In another aspect combinable with any one of the previous aspects, the technical reports include at least one of: a local or regional geologic study; a local or regional geophysical study; an earthquake derived crustal thickness map; or a site study for hydrology.

In another aspect combinable with any one of the previous aspects, the remote sensing data includes at least one of: satellite sensing data; aerial sensing data; or surficial sensing data.

In another aspect combinable with any one of the previous aspects, the remote sensing data includes at least one of gravimetric data; soil type; magnetic field data; electromagnetic data; fiber arrays; infrared imaging; hyperspectral imaging; or teleseismic wavefield data.

In another aspect combinable with any one of the previous aspects, the geological characteristics of the one or more data layers includes at least one of mineralogical composition; water content; metal abundance; fault or fracture boundary locations; porosity; density; volcanic activity; rock type; gamma radiation; neutron activity; sonic activity; resistivity; temperature, or grain or clast size.

In another aspect combinable with any one of the previous aspects, the operations further include providing, via an application programming interface (API), a model representing the at least partially global subsurface model of the subsurface, wherein the model is presented in a plurality of adjustable data layers.

In another aspect combinable with any one of the previous aspects, the at least partially global subsurface model includes the inferred data and the geoscience data, and collectively forms a complete, global subsurface model of the Earth.

In another aspect combinable with any one of the previous aspects, the operations further include identifying one or more user data layers provided by a user; and displaying the user data layers in the user interface with the at least partially global subsurface model.

In another aspect combinable with any one of the previous aspects, the at least partially global subsurface model further includes a repository of data layers arranged in a hierarchy, including at least one of publicly shared user data layers; private user data layers; or historical data layers.

In another aspect combinable with any one of the previous aspects, one or more data layers can be toggled between an active and an inactive state.

In another aspect combinable with any one of the previous aspects, the operations further include in response to a user request, generating a hybrid data layer, wherein the hybrid data layer includes a combination of data from one or more data layers, and wherein the hybrid data layer is generated pursuant to a desired configuration indicated in the user request.

In another aspect combinable with any one of the previous aspects, the operations further include, in response to a user request, selection of an algorithm and a set of data layers, executing the algorithm on the set of data layers to provide an additional output data layer.

In another aspect combinable with any one of the previous aspects, the operations further include receiving, from the user, a custom algorithm; and executing the custom algorithm on one or more data layers to produce an additional output data layer.

In another aspect combinable with any one of the previous aspects, the remote sensing data includes imaging data that is tagged with information including at least one of outcrop locations; vegetation type; vegetation species; or a topological overlay.

In another aspect combinable with any one of the previous aspects, remote sensing data associated with the subsurface includes a surficial model generated as a result of a machine learning process.

In another aspect combinable with any one of the previous aspects, the at least partially global subsurface model includes a continental subsurface model.

In another aspect combinable with any one of the previous aspects, the at least partially global subsurface model includes a global subsurface model.

In another example implementation, techniques for generating a subsurface model include identifying geoscience data associated with one or more particular regions of a subsurface, where the geoscience data includes information associated with the lithology of the one or more particular regions of the subsurface; identifying surficial data associated with the subsurface; identifying remote sensing data associated with the subsurface; correlating the geoscience data with the remote sensing data using at least one machine learning model to determine inferred data representing surficial rock of one or more regions of the subsurface associated with the remote sensing data where geoscience data is unavailable; generating a subsurface model of the subsurface including one or more data layers, each data layer representing at least one characteristic of the subsurface rocks of the one or more regions of the subsurface associated with the remote sensing data or surficial data where geoscience data is unavailable; and generating a graphical representation of the subsurface model for display on a user interface.

In aspect combinable with the example implementation, the surficial data associated with the subsurface includes at least one of rock type classification; boundary locations; outcrop locations; outcrop types; or grain or clast size.

In another aspect combinable with any one of the previous aspects, the geoscience data includes at least one of seismic data; wireline logs; drill core data; construction permitting documents; production logs; soil surveys; or technical reports.

In another aspect combinable with any one of the previous aspects, the technical reports include at least one of a local or regional geologic study; a local or regional geophysical study; an earthquake derived crustal thickness map; composition logs; or a site study for hydrology.

In another aspect combinable with any one of the previous aspects, the remote sensing data includes at least one of satellite sensing data; aerial sensing data; or surficial sensing data.

In another aspect combinable with any one of the previous aspects, the remote sensing data includes at least one of gravimetric data; magnetic field data; electromagnetic data; fiber arrays; or teleseismic wavefield data.

In another aspect combinable with any one of the previous aspects, the operations further include: identifying one or more user data layers provided by a user; and displaying the user data layers in the user interface with the at least partially global subsurface model.

In another aspect combinable with any one of the previous aspects, the operations further include in response to a user request, generating a hybrid data layer, the hybrid data layer including a combination of data from one or more data layers.

In another aspect combinable with any one of the previous aspects, the hybrid data layer is generated based at least in part on a desired configuration indicated in the user request.

In general, innovative aspects of the subject matter described in this specification can be embodied in methods that include the actions of using a machine learning model to determine subsurface characteristics of the subsurface. Other implementations of this aspect include corresponding systems, apparatus, and computer programs configured to perform the actions of the methods that are encoded on computer storage devices.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

This disclosure describes a system and method for generating a subsurface model representing lithological characteristics and attributes of the subsurface of a celestial body or planet (e.g., the Earth's crust). By automatically ingesting data from many sources, a machine learning system can infer information about the characteristics of one or more regions of the subsurface and build a model representing the subsurface rock properties. In some cases, this can provide information about a region using inferred data, where no direct measurements have been taken, which can alleviate the need for extensive manual surveys and exploration. Geological data, such as surveys or drill cores can be collected and typically are used to generate detailed lithological information for a small region. If information for a large region, or at a global scale is required, then additional surveys or other geoscience data (e.g., seismic data, wireline logs, or soil surveys) must be completed for the larger area. This process is impractical at a global scale or for extremely large regions. Other data, however, is available for the Earth's surface or near subsurface which can be remotely sensed. Remote sensing data, such as aerial or satellite imagery (e.g., satellite visible, infrared, ultraviolet, and/or hyperspectral imagery), gravimetric data, magnetic field data, electromagnetic data, teleseismic wave-field data, topological data, and other information can be readily collected or is already available at scale. Lithological attributes and characteristics present in available geoscience data can be correlated with related remote sensing data using a machine learning model, which can then infer lithological attributes and characteristics for regions where remote sensing data is available, but geoscience data is not. Additionally, machine learning methods may be used to infer and/or predict unavailable information and augment geophysical point and volume datasets (e.g., generative adversarial networks (GANs) for filling seismic datasets, recurrent neural network architectures such as long short-term memory (LSTM) to recreate missing well log curves).

The present disclosure describes a platform that yields a process for scalable, automatic generation of subsurface models and aggregation of high-probability features and characteristics into a global subsurface model. In some aspects, the platform exposes application programming interfaces (APIs) and developer tools to allow access to data and algorithms/models, as well as augmenting the platform with bespoke data algorithms and models. In some aspects, a rich metadata tier is populated across all data types at ingestions, allowing subsurface focused search to be executed across all data, with a focus analogue search through knowledge graph correlation and similarity.

A global subsurface model according to the present disclosure may be a subsurface model of all or part of the Earth's subsurface. For example, in some aspects, a global subsurface model may be a subsurface model of an entirety of the Earth's subsurface (e.g., a global subsurface model). In some aspects, a global subsurface model may be a partially global subsurface model (e.g., a subsurface model of less than the entirety of the Earth's subsurface model). For example, a partial global subsurface model may be a continental subsurface model, e.g., a subsurface model of a single continent or more than one continent, while not being a subsurface model of the entirety of the Earth's subsurface. In some aspects, a partial global subsurface model may be a subsurface model of an area less than a continent, or split between two or more continents. Thus, subsurface models according to the present disclosure may or may not include subsurface areas (or volumes) between two or more geographic or geopolitical land or water designations. Of course, subsurface models according to the present disclosure may include information on subsurfaces below a body of water (e.g., lake, river, sea, ocean, fjord, gulf).

The inferred data can be combined with measured data, and a large-scale subsurface model can be created and then provided to a user for display or analysis. The subsurface model can be a two dimensional (2D) or three dimensional (3D) model comprising a multitude of data layers, each data layer representing one or more features of the subsurface (e.g., Earth's crust.) For example, a first data layer might include a 2D heat map of the Earth representing iron concentration. A second data layer may have a series of 3D models representing specific veins of ore or hydrologic features. Each data layer can be activated or deactivated, as well as searched by a user. In some implementations, the subsurface model can include a one dimensional (1D) set of data (e.g., a point data layer). Additionally, the data layers can be exposed via an API which allows users to flexibly examine and explore each data layer, as well as perform analyses on a single data layer or group of data layers. The data layers can be accessed at various levels of abstraction, visual scale, spatial indexes and in three dimensions to facilitate scaled data processing, analysis, model training and inference. In some implementations, pre-built algorithms can be provided for processing information in one or more data layers. For example, a user may want to correlate information from a data layer representing vegetation with a data layer representing hydrologic data. A pre-built algorithm may be provided for the user to make a third data layer representing the correlation between hydrologic data and vegetation. In some implementations, users can develop custom algorithms that ingest the data layers via an API. In this manner, users can perform their own custom analysis on the provided data layers. These custom and pre-built algorithms can be executed either locally, at a user's device or in the cloud, for example, on a server based platform. These custom data layers and user data can have visibility and security attributes that are configurable by the user.

Figure 1:
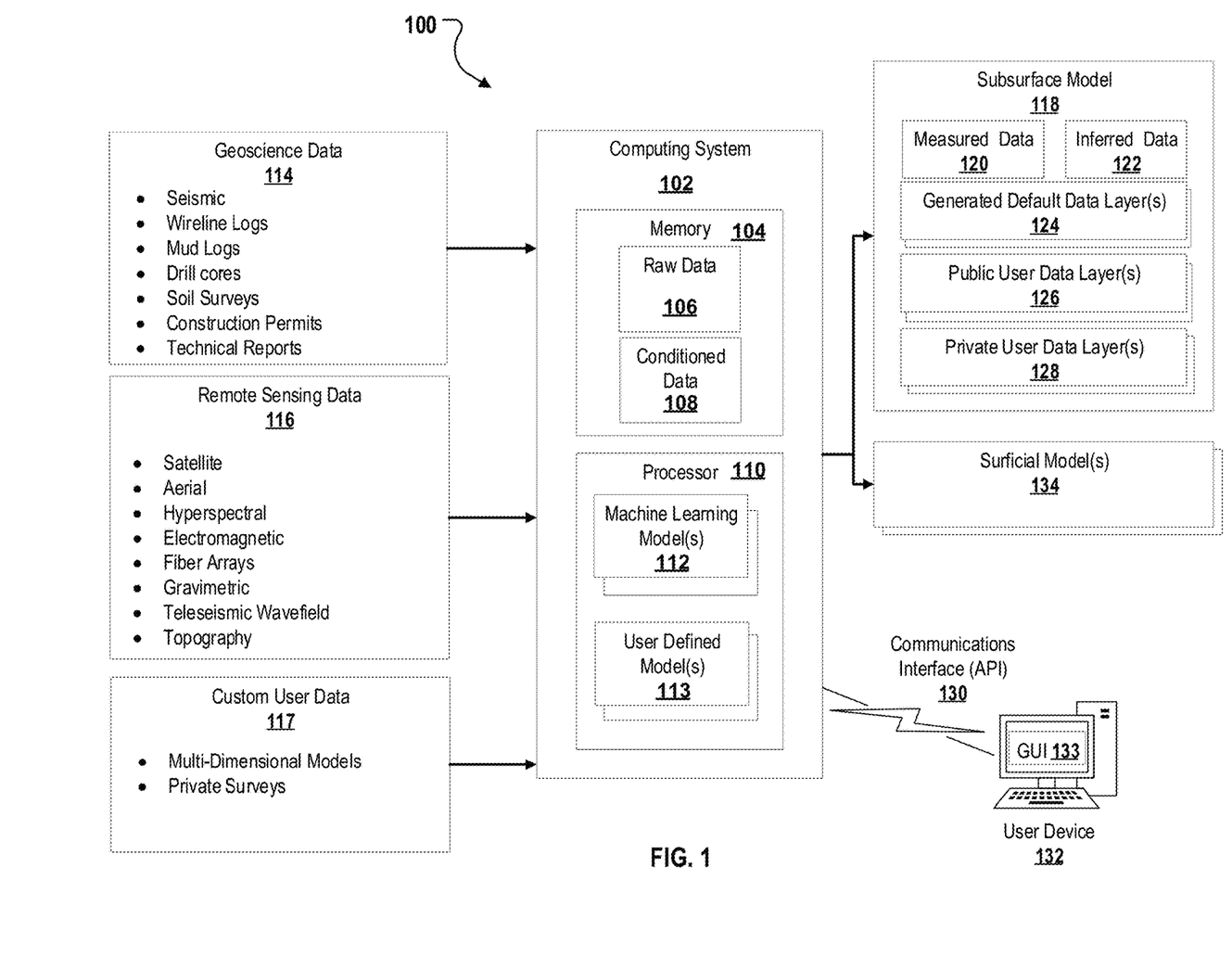
FIG. 1 depicts an example implementation of at least a portion of a system for generating a subsurface model of a celestial body's subsurface.

Turning to the illustrated example implementation, FIG. 1 is a block diagram illustrating an example system 100 for generating a subsurface model of a subsurface. The system 100 includes a computing system 102, which generally ingests data such as geoscience data 114 and remote sensing data 116 and generates a subsurface model 118. The computing system 102 includes at least one memory 104 and at least one processor 110 for executing instructions.

The computing system 102 receives raw data 106 from various sources, such as user computing devices, a network, or other input. The computing system 102 can be a distributed computer system, or a singular system. In some implementations, the raw data 106 can be received in real-time. The raw data 106 is then used by one or more machine learning models (e.g., machine learning, conventional statistics-based models, etc.) 112 to generate an output such as, for example, an updated 3D block model in a data layer, or an entirely new subsurface model 118. The raw data 106 can include one of, or any combination of, geoscience data 114 and remote sensing data 116. Geoscience data 114 and remote sensing data 116 can be provided by users via one or more user devices 132 and a communications interface 130. In some implementations the data is automatically harvested or gathered by the computing system 102. In other implementations, the data can be manually uploaded by one or more users. The one or more user devices 132 can include a graphical user interface (GUI) 133, which can allow the user to interact with different portions of the system 100, such as the machine learning models 112, memory 104, subsurface model 118, and surficial models 134. An example GUI 133 is illustrated in greater detail below with reference to FIG. 2.

Geoscience data 114 can include, but is not limited to seismic data, wireline logs (e.g., measurements of subsurface properties with an instrument in a borehole), mud logs, drill core data, soil surveys, assay data, geochemical data, and construction permits. For example, a set of construction permits for a series of buildings in a particular region may include lithological information regarding ground composition for an upper layer of the subsurface for a particular region. In another example, wireline logs may provide detailed information measured at tens of thousands of feet below the surface in boreholes of an oil field.

Remote sensing data 116 can include, but is not limited to satellite or aerial imagery, hyperspectral scans of the Earth's surface, electromagnetic and gravimetric scan, taken at the surface or by aircraft, fiber arrays, production logs, technical reports (e.g., regional geologic studies, magnetic data, regional geophysical studies, earthquake derived crustal thickness maps, and/or hydrology site studies), teleseismic wavefield data, and topography data. For example, fiber cable arrays can be used to detect teleseismic earthquakes, near field active, and ambient sources. These detections can then be inverted to quantify subsurface velocity models, and therefore rock attributes.

Optionally, custom user data 117 can be provided to the computing system 102. In some implementations, the custom user data 117 can include custom subsurface data or models, that can be one-dimensional, two-dimensional or multi-dimensional (e.g., 3D, or a 4D time series, etc.). For example, custom user data 117 could include local gravity field information, or survey data from a private survey for a particular region.

The raw data 106 can then be converted into conditioned data 108 in order to enhance the output and processing of the machine learning models 112. In some implementations the computer system 102 conditions the data. In other implementations, the data can be conditioned remotely (e.g., at the sensor collecting the data, or at a cloud processing server). For example, raw wireline data may be ingested by the computing system 102, which may then transmit the wireline data to a remote server to perform noise filtering, and remove unnecessary data before it is transmitted back to the computing system 102 as conditioned data 108. In another example, a series of aerial photographs may be received as raw data 106. The computing system 102 may condition the aerial photographs using a machine learning model to add labels or tags to specific features in the aerial photographs (e.g., outcrops). Alternatively, labels and tags could be added manually by a user or by a separate machine learning process (e.g., a computer vision model). In some implementations, the API can ingest labeled data. In some implementations, a user interface can be provided to allow users to label data manually. Conditioned data 108 can include, but is not limited to structured information that has been extracted from published documents (e.g., extracting data arrays from pdf files), filtering or noise reduction on provided data, identification and removal of null traces in data, or quality index determination based on additional data pre-processing.

A combination of geoscience data 114, remote sensing data 116, and optionally custom user data 117, can be used as input to one or more machine learning models 112, and can be either raw data 106 or conditioned data 108. In some instances, the conditioned data 108 includes geoscience data 114 or remote sensing data 116 that has been processed through a machine learning network (e.g., generative adversarial networks (GANs) or recurrent neural network architectures such as long short-term memory (LSTM)) to improve the data sets. The machine learning model(s) 112 may also accept external parameters as input, such as weather data, temperature, time of day, date, or location. In some implementations the machine learning models 112 can receive data as a time series, and produce a four dimensional output (e.g., three space dimensions and a time dimension.) The machine learning models 112 receive the raw data 106 and/or the conditioned data 108 and generate an output. In some implementations, the machine learning model 112 can provide a global subsurface model 118 which is described in greater detail below. In some implementations, the computing system 102 can provide information related to the output for display on a user computing device. The computing system 102 can also store the subsurface model 118 in a memory, or transmit it to a cloud storage platform. In one implementation, the computing system 102 can share its output on a cloud platform with other machine learning systems and the data can be further analyzed.

In some implementations, the machine learning models 112 include one or more deep learning models that employ multiple layers of models to generate an output for a received input. A deep neural network is a deep machine learning model that includes an output layer and one or more hidden layers that each apply a non-linear transformation to a received input to generate an output. In some cases, the neural networks may include a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some implementations, the machine learning models 112 include a convolutional neural network. In some implementations, the machine learning models 112 are an ensemble of models that may include all or a subset of the architectures described above.

In some implementations, the machine learning models 112 can include a feedforward autoencoder neural network. For example, the machine learning models 112 can have a three-layer autoencoder neural network. The machine learning models 112 may include an input layer, a hidden layer, and an output layer. In some implementations, the neural network has no recurrent connections between layers. Each layer of the neural network may be fully connected to the next, e.g., there may be no pruning between the layers. The neural network may include an optimizer for training the network and computing updated layer weights, such as, but not limited to, ADAM, Adagrad, Adadelta, RMSprop, or other Stochastic Gradient Descent (SGD), or SGD with momentum. In some implementations, the neural network may apply a mathematical transformation, e.g., a convolutional transformation or factor analysis to input data prior to feeding the input data to the network.

In some implementations, the machine learning models 112 can be a supervised model. For example, for each input provided to the model during training, the machine learning models 112 can be instructed as to what the correct output should be. The machine learning models 112 can use batch training, e.g., training on a subset of examples before each adjustment, instead of the entire available set of examples. This may improve the efficiency of training the model and may improve the generalizability of the model. The machine learning models 112 may use folded cross-validation. For example, some fraction (the "fold") of the data available for training can be left out of training and used in a later testing phase to confirm how well the model generalizes. In some implementations, the machine learning models 112 may be an unsupervised model. For example, the model may adjust itself based on mathematical distances between examples rather than based on feedback on its performance. In some examples, the model may be trained in an adversarial manner. In some examples, the model may be trained using multiple objectives, loss functions or tasks.

A machine learning model 112 can be trained to recognize patterns and correlations between geoscience data 114 and remote sensing data 116. In some examples, the machine learning models 112 can be trained on hundreds of recorded images or logs. For example, generative adversarial network (GAN) machine learning models can be used to fill in data gaps in seismic and well log data sets. The machine learning models 112 can be trained to identify specific lithological parameters or attributes of a region from remote sensing data 116. For example, the machine learning model can identify, from the remote sensing data 116, mineralogical composition, water content, metal abundance, fault or fracture boundaries, porosity and density, volcanic activity, rock type, grain or clast size of a region, among other features.

The machine learning models 112 can be configured to provide a binary output, e.g., a yes or no indication of whether a particular mineral is present. In some examples, the machine learning models 112 are configured to determine multiple lithological characteristics and a certainty rating for each characteristic. Ultimately, the one or more machine learning models 112 are used to produce a new, or updated, subsurface model 118.

In some implementations, user defined models 113, can be made available publicly or privately (e.g., via communications interface 130) which can ingest the raw data 106 and/or the conditioned data 108 and generate custom subsurface models 118. The user defined models 113 can be machine learning models similar to, or different from machine learning models 112, or other models (e.g., conventional predictive models, or heuristic/classical models). In some implementations, the one or more machine learning models produces one or more surficial models 134.

The surficial model 134 can be a representation of the rock type at the surface for a large region, and can be based on satellite imagery or other inputs to the machine learning models 112 as either conditioned data 108 or raw data 106. The surficial model 134 can additionally include soil information. For example, satellite imagery may be received by the computing system 102 as raw data and processed through a first machine learning model 112 to remove or alter vegetation, resulting in conditioned data 108. The vegetation conditioned data 108 can be processed by a second machine learning model 112 to produce a surficial model 134, which can represent surficial rock type (e.g., sedimentary, igneous, metamorphic) for a particular region (e.g., the state of California). The surficial model 134 can then be incorporated as inferred data 122 in a subsurface model 118, or otherwise used as an additional input (conditioned data 108) to further machine learning processes in the development of the subsurface model 118. Further analysis can be based on data in the surficial models 134. For example, analysis can be done to determine earthquake potential field analysis, earthquake hazard maps, geology/watershed process engineering, infrastructure engineering and design, agriculture and hydrology. The surficial model 134 can include boundary conditions and in some instances, grain and clast size as well.

The subsurface model 118 includes measured data 120 and inferred data 122 and represents subsurface features of the subsurface in a plurality of data layers. Measured data 120 can represent actual data, such as geoscience data 114 or remote sensing data 116, which can be presented in a data layer (e.g., aerial imagery can be a data layer) or can be presented as an overlay to a data layer (e.g., well locations can be marked in a hydrologic data layer showing water concentration at a particular depth range below the surface). The subsurface model 118 also includes inferred data 122, which can be data that is determined or approximated using the machine learning models 112. For example, a first machine learning model can determine a vegetation concentration and/or species based on satellite imagery, a second machine learning model (or the same model) can then infer data regarding mineralogical composition of the surface on near surface regions based on a combination of the vegetation concentration and topological data. This mineralogical composition can be presented as inferred data 122 and can have a certainty or probability associated with it. Inferred data 122 and measured data 120 can be formatted in data layers for presentation or further analysis.

Users can interact with the subsurface model 118 via a communications interface 130, such as an application programming interface (API). Generally, the communications interface 130 comprises logic encoded in software and/or hardware in a suitable combination and operable to enable communications with a network and other components. More specifically, the communications interface 130 can comprise software supporting one or more communication protocols associated with communications, such that the network and/or interface's hardware is operable to communicate physical signals within and outside of the illustrated system 100. Still further, the communications interface 130 can allow the computing system 102 to communicate with the user device(s) 132 to perform the operations described herein.

In some implementations, the computing system 102 generates a set of default data layers 124. These data layers will be generated with each new or updated subsurface model 118 and can be made accessible to all users. Exemplary default data layers can include, but are not limited to, raw imaging, topography, a data concentration layer (e.g., a layer that displays the amount of data available for specific regions of the subsurface), a road or border (e.g., county border) overlay, among others. Default data layers 124 can also include layers that depict measured data 120, such as well locations or survey data, as well as inferred data 122, or a combination thereof.

In addition to default data layers 124, a user can create and upload custom data layers to be shared publicly. These public user data layers 126 can include measured data provided by the user, or an analysis of processing of one or more default data layers in order to generate a custom data layer that the user can then choose to make public. For example, a user may upload a dataset containing geoscience data 114 that indicates gold concentration for a portion of a particular region of North America. The computing system may then ingest this new geoscience data 114, and combine it with previously obtained geologic and remote sensing data to update a generated default layer 126 that represents estimated gold concentration in the entire region of North America. The user can then access the updated gold concentration layer as well as a layer representing topography for the region of North America. The user may then run a custom algorithm, or code in order to create a data layer representing suitable locations for a gold mine based on the topology and the updated estimated gold concentration layer. In some implementations, the user may wish to keep this finally created data layer private and can have the data layer stored in the computing system 102 as a private user data layer 128. In this implementation, specific credentials can be required to access the private user data layers 128. In some implementations, the custom user data 117 is also private, or shared amongst a secure group of users or organizations. In some implementations, a created data layer may be partially private, and partially public. For example, a data layer representing estimated gold concentration may include a public user data layer 126 which includes estimated gold concentration for North America only, while the global estimated gold concentration later can be a private user data layer 128.

Figure 2:
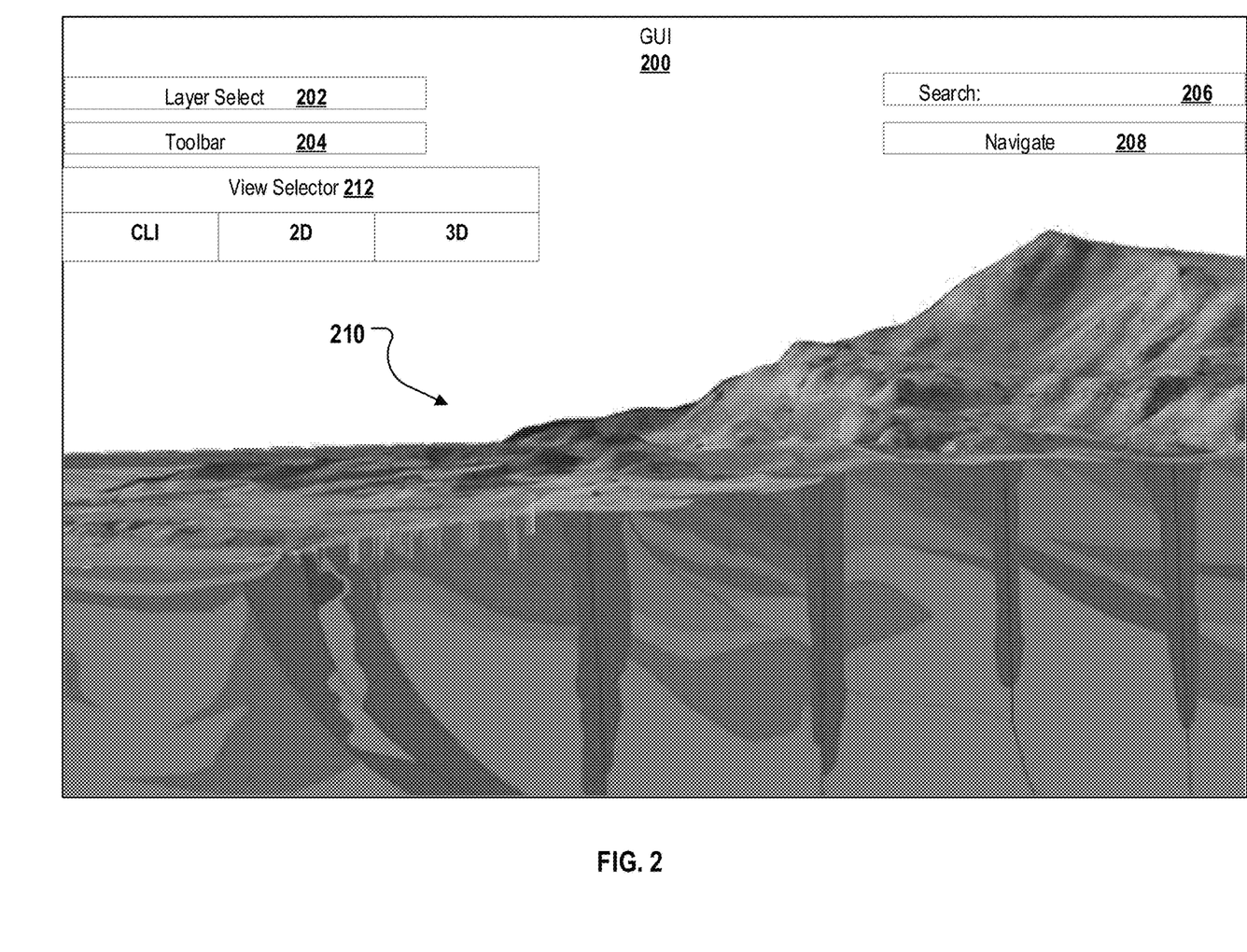
FIG. 2 is an example GUI representing a display of a subsurface model.

FIG. 2 is an example graphical user interface (GUI) representing a display of a subsurface model. GUI 200 interfaces with at least a portion of the system 100 for any suitable purpose, including generating a visual representation of any particular data layer and/or combination of data layers and content associated with any components of the system 100. In particular, the GUI 200 can be used to present results of an algorithm or analysis conducted on one or more data layers via the computing system 102 and the subsurface model 118, as well as to otherwise interact and present information associated with one or more applications. GUI 200 can also be used to view and interact with various web pages, applications, and web services located local or external to the client device 132. In some implementations, data layers presented in GUI 200 are automatically aggregated or show a level of detail based on a current zoom level. For example, a data layer that has 1000 data points per square mile, may only show a single averaged data point if the GUI is displaying 100 square miles. When the same data layer is shown in a 1 square mile view, the entire data set might be visible. Generally, the GUI 200 provides the user with an efficient and user-friendly presentation of data provided by or communicated within the system. The GUI 200 can comprise a plurality of customizable frames or views having interactive fields, pull-down lists, and buttons operated by the user. In general, the GUI 200 is often configurable, supports a combination of tables and graphs (bar, line, pie, status dials, etc.), and is able to build real-time portals, application windows, and presentations. Therefore, the GUI 200 contemplates any suitable graphical user interface, such as a combination of a generic web browser, a web-enabled application, intelligent engine, and command line interface (CLI) that processes information in the platform and efficiently presents the results to the user visually.

The GUI 200 can have a main display window 210 which displays a graphical representation of one or more data layers as selected by the user. This graphical display can be navigable via mouse or keyboard inputs, among other things (e.g., touch screen inputs). In some implementations, the main display window 210 shows a 3D representation of one or more data layers. In another implementation, the data window 210 can show a simple 2D, map style interface, and have, for example, an adjustable slider representing depth below the surface. In some implementations, GUI 200 includes a view selector 212, which allows the user to toggle between different presentations (e.g., command line interface (CLI), 2D view, or 3D view). In some implementations, presentations can include a 4D view, which presents three spatial dimensions and is animated to display a time dimension (e.g., with a play/pause/rewind button).

The GUI 200 can include a navigation bar 208, which allows the user to navigate and/or adjust their current view or view location. It can also include a search bar 206, which can contextually search a specified area or region based on user inputs. A layer select tool 202 can allow the user to toggle on or off layers such as default layers, public layers and private layers generated by the computing system 102. A toolbar 204 can provide access to additional tools, such as tools that allow execution of pre-build algorithms provided by the computer system 102 on the currently active data layer(s) or location. In some implementations, a tool can be provided that allows a user to create and run custom algorithms within the GUI 200 itself. In some implementations, a tool can be provided for a user to upload their algorithm and have it execute on a remote or cloud server, alleviating the need for the user to have the computing resources required to run their algorithm on the data.

Figure 3:
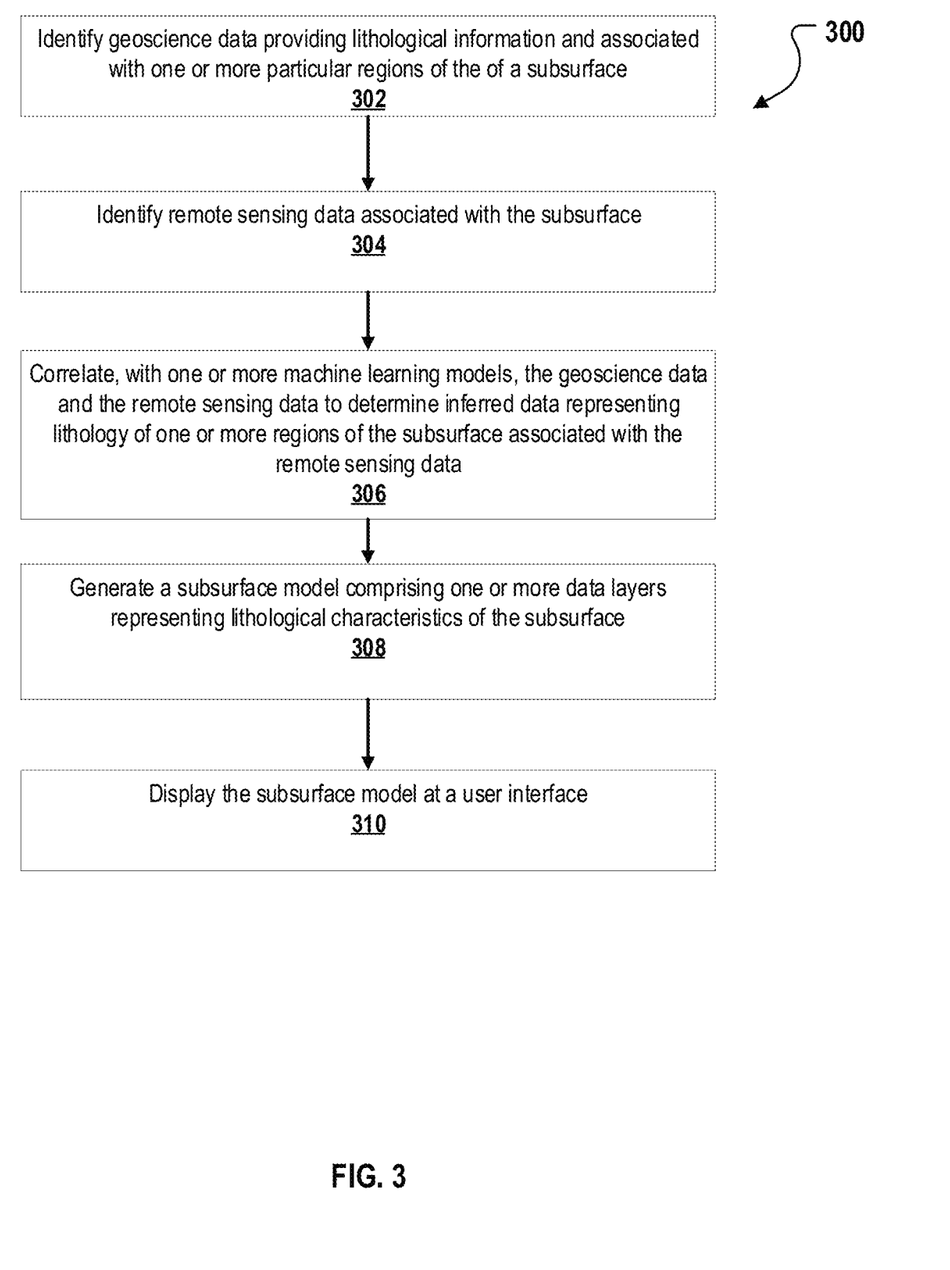
FIG. 3 is a flowchart describing an example method for generating and displaying a subsurface model.

FIG. 3 is a flowchart describing an example method for generating and displaying a subsurface model. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, geoscience data providing lithological information for one or more particular regions of the subsurface is identified. Geoscience data can include, but is not limited to, seismic data, wireline logs (e.g., measurements of formation properties with an instrument in a borehole), mud logs, drill circular of a region may include lithological information regarding ground composition for an upper layer of the subsurface for a particular region. In another example, wireline logs may provide detailed information measured at tens of thousands of feet below the surface in boreholes of a hydrocarbon reservoir. In some implementations the geoscience data is uploaded to a system manually. In another implementation, the geoscience data is automatically ingested by the system when it becomes available (e.g., the system performs web crawling to ingest data).

At 304, remote sensing data associated with the Earth's (or other celestial body's) surface or subsurface is identified. Remote sensing data can include, but is not limited to satellite or aerial imagery, hyperspectral scans of the Earth's surface, electromagnetic and gravimetric scan, taken at the surface or by aircraft, fiber arrays, production logs, technical reports (e.g., regional geologic studies, regional geophysical studies, earthquake derived crustal maps, hydrology site studies, faults maps), teleseismic wavefield data, and topography data. Remote sensing data can be identified via the same, or different methods as the geoscience data.

At 306, one or more machine learning models are used to correlate the geographic data and the remote sensing data in order to determine inferred data. The inferred data represents one or more lithological characteristics or attributes associated with one or more regions of the subsurface that are represented by the remote sensing data. In some implementations, data is generated or improved by one or more machine learning models prior to determining inferred data from the generated or improved data. These lithological characteristics can be, for example, mineralogical composition, water content, metal abundance, fault or fracture boundaries, porosity and density, volcanic activity, rock type, gamma radiation, neutron activity, sonic activity, resistivity, temperature, grain or clast size of a region. Additionally, macro characteristics of the region can be included with the lithological characteristics. Macro characteristics can include, but are not limited to, faults, rifts, basins, and plate geometry.

At 308, a subsurface model of the subsurface is generated. The subsurface model includes one or more data layers representing the lithological characteristics of the subsurface. The subsurface model can include both inferred and measured data, and can be similar to, or different from the subsurface model 118 as described with reference to FIG. 1.

At 310, the subsurface model is displayed at a user interface. The subsurface model can be displayed, for example, in a GUI at a monitor of a user's personal computer. In some implementations the subsurface model can be displayed as a heads-up-display (HUD) (e.g., as an overlay in an augmented reality headset, or on a dash/cockpit display of a vehicle).

Figure 4:
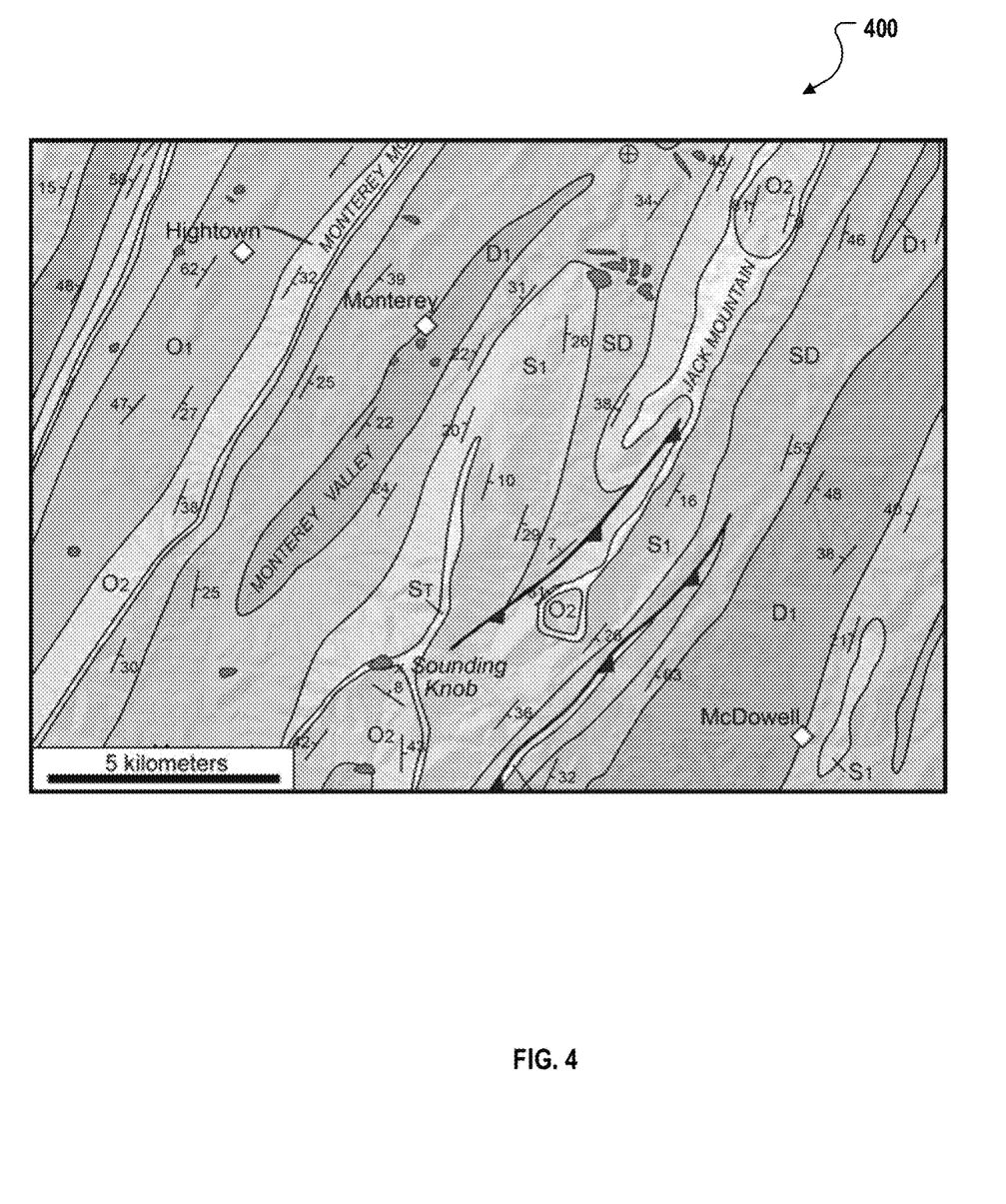
FIG. 4 depicts an example surficial rock model.

FIG. 4 depicts an example surficial rock model. The surficial rock model of 400 of FIG. 4 can be similar to or different from surficial rock model 134 as described in FIG. 1. Classical surface geologic models have been accumulated by hundreds of field geologists over hundreds of years and ultimately have culminated in the form of surface geologic maps that are sampled sparsely and coarsely over the surface of the Earth. For example, accurate measurements used by geologists are brunton compass measurements on outcrops, that achieve dip and strike as well as rock type and formation (if available), resulting in a very generalized geologic map similar to that of FIG. 4.

Conventionally, this required a geologist to walk the field, logging any exposed feature he/she could get to. Since these days, other mapping techniques have been attempted, such as aerial and some satellite studies. These techniques work, but remain as local studies because of local geologic knowledge needed, and also lack of image processing needed to be successful at large scale. With the satellite, imagery, and geoscience knowledge available, this disclosure presents an automated tool for surficial rock type identification that can be used to gain insights into subsurface geology. Conventional surficial models are regional in nature and lose the detailed rock profiles because they were logged coarsely. Using processing techniques to remove unwanted human and natural features, much more robust, cheaper and higher resolution surface geology maps can be achieved. These surficial models can be used for various novel applications, and improving on existing applications. For example, only the largest and most obvious surficial features are currently being utilized, and many poorly sampled features have been missed that could add substantial business and academic value.

Figure 5:
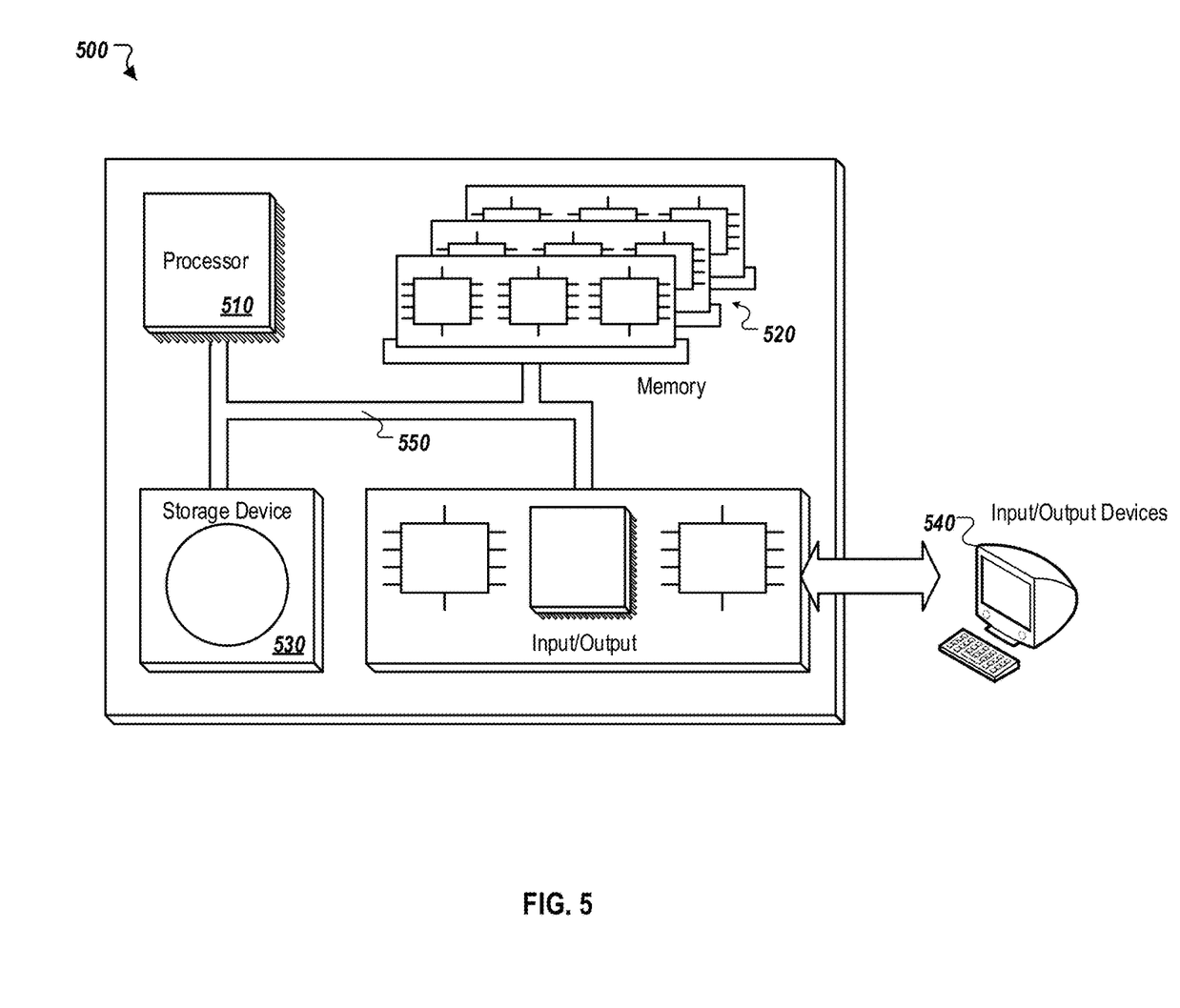
FIG. 5 depicts a computing system for generating a subsurface model.

FIG. 5 is a schematic diagram of a computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., computing system 102) and their structural equivalents, or in combinations of one or more of them. The system 500 is intended to include various forms of digital computers, such as laptops, desktops, workstations, servers, blade servers, mainframes, and other appropriate computers. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The machine learning model can run on Graphic Processing Units (GPUs) or custom machine learning inference accelerator hardware.

To provide for interaction with a user, the features can be implemented on a computer having a display device such as a CRT (cathode ray tube) or LCD (liquid crystal display) monitor for displaying information to the user and a keyboard and a pointing device, such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus that comprises a non-transitory, computer-readable storage medium that comprises instructions that, when executed by at least one processor, cause the at least one processor to perform operations comprising:
   identifying geoscience data associated with one or more particular regions of a subsurface, the geoscience data comprising information associated with the lithology of the one or more particular regions of the subsurface;
   identifying remote sensing data associated with the subsurface;
   correlating the geoscience data with the remote sensing data using at least one machine learning model to determine inferred data representing lithology of one or more regions of the subsurface associated with the remote sensing data where geoscience data is unavailable;
   generating an at least partially global subsurface model of the subsurface comprising one or more data layers, each data layer representing at least one geological characteristic of the subsurface, wherein the at least partially global subsurface model comprises a continental subsurface model; and
   generating a graphical representation of the at least partially global subsurface model for display at a user interface.

2. The apparatus of claim 1, wherein the geoscience data comprises at least one of: seismic data; wireline logs; drill core data; construction permitting documents; production logs; soil surveys; or technical reports.

3. The apparatus of claim 2, wherein the technical reports comprise at least one of: a local or regional geologic study; a local or regional geophysical study; an earthquake derived crustal thickness map; or a site study for hydrology.

4. The apparatus of claim 1, wherein the remote sensing data comprises at least one of: satellite sensing data; aerial sensing data; or surficial sensing data.

5. The apparatus of claim 4, wherein the remote sensing data comprises at least one of: gravimetric data; soil type; magnetic field data; electromagnetic data; fiber arrays; infrared imaging; hyperspectral imaging; or teleseismic wavefield data.

6. The apparatus of claim 1, wherein the geological characteristics of the one or more data layers comprises at least one of: mineralogical composition; water content; metal abundance; fault or fracture boundary locations; porosity; density; volcanic activity; rock type; gamma radiation; neutron activity; sonic activity; resistivity; temperature, or grain or clast size.

7. The apparatus of claim 1, wherein the operations further comprise providing, via an application programming interface (API), a model representing the at least partially global subsurface model of the subsurface, wherein the model is presented in a plurality of adjustable data layers.

8. The apparatus of claim 1, wherein the at least partially global subsurface model comprises the inferred data and the geoscience data, and collectively forms a complete, global subsurface model of the Earth.

9. The apparatus of claim 1, wherein the operations further comprise:
   identifying one or more user data layers provided by a user; and
   displaying the user data layers in the user interface with the at least partially global subsurface model.

10. The apparatus of claim 9, wherein the at least partially global subsurface model further comprises a repository of data layers arranged in a hierarchy, comprising at least one of: publicly shared user data layers; private user data layers; or historical data layers.

11. The apparatus of claim 9, wherein one or more data layers can be toggled between an active and an inactive state.

12. The apparatus of claim 9, wherein the operations further comprise in response to a user request, generating a hybrid data layer, wherein the hybrid data layer comprises a combination of data from one or more data layers, and wherein the hybrid data layer is generated pursuant to a desired configuration indicated in the user request.

13. The apparatus of claim 9, wherein the operations further comprise, in response to a user request, selection of an algorithm and a set of data layers, executing the algorithm on the set of data layers to provide an additional output data layer.

14. The apparatus of claim 9, wherein the operations further comprise:
   receiving, from the user, a custom algorithm; and
   executing the custom algorithm on one or more data layers to produce an additional output data layer.

15. The apparatus of claim 1, wherein the remote sensing data comprises imaging data that is tagged with information comprising at least one of: outcrop locations; vegetation type; vegetation species; or a topological overlay.

16. The apparatus of claim 1, wherein remote sensing data associated with the subsurface comprises a surficial model generated as a result of a machine learning process.

17. The apparatus of claim 1, wherein the at least partially global subsurface model comprises a global subsurface model.

18. A computer-implemented method for generating a subsurface model of a subsurface, the method comprising:
    identifying, with one or more processors, geoscience data associated with one or more particular regions of the subsurface, the geoscience data comprising information associated with the lithology of the one or more particular regions of the subsurface;
    identifying, with one or more processors, remote sensing data associated with the sub surface;
    correlating, with one or more processors, the geoscience data with the remote sensing data using at least one machine learning model to determine inferred data representing lithology of one or more regions of the subsurface associated with the remote sensing data where geoscience data is unavailable;
    generating, with one or more processors, an at least partially global subsurface model of the subsurface comprising one or more data layers, each data layer representing at least one geological characteristic of the subsurface wherein the at least partially global subsurface model comprises a continental subsurface model; and
    generating, with one or more processors, a graphical representation of the at least partially global subsurface model for display at a user interface.

19. A system for generating an at least partially global subsurface model, the system comprising:
    one or more processors;
    one or more tangible, non-transitory computer-readable media operably connectable to the one or processors and storing instructions that, when executed, cause the one or more processors to perform operations comprising:
        identifying geoscience data associated with one or more particular regions of a subsurface, the geoscience data comprising information associated with the lithology of the one or particular regions of subsurface;
        identifying remote sensing data associated with the subsurface;
        correlating the geoscience data with the remote sensing data using at least one machine learning model to determine inferred data representing lithology of one or more regions of the subsurface associated with the remote sensing data where geoscience data is unavailable;
        generating an at least partially global subsurface model of the subsurface comprising one or more data layers, each data layer representing at least one geological characteristic of the subsurface wherein the at least partially global subsurface model comprises a continental subsurface model; and
        generating a graphical representation of the at least partially global subsurface model for display at a user interface.

20. The system of claim 19, wherein the operations further comprise:
    identifying one or more user data layers provided by a user; and
    displaying the user data layers in the user interface with the at least partially global subsurface model, wherein the one or more data layers can be toggled between an active and an inactive state.

21. An apparatus that comprises a non-transitory, computer-readable storage medium that comprises instructions that, when executed by at least one processor, cause the at least one processor to perform operations comprising: identifying geoscience data associated with one or more particular regions of a subsurface, the geoscience data comprising information associated with the lithology of the one or more particular regions of the subsurface; identifying remote sensing data associated with the subsurface; correlating the geoscience data with the remote sensing data using at least one machine learning model to determine inferred data representing lithology of one or more regions of the subsurface associated with the remote sensing data where geoscience data is unavailable; generating an at least partially global subsurface model of the subsurface comprising a repository of data layers arranged in a hierarchy, comprising at least one of: (1) publicly shared user data layers, (2) private user data layers, or (3) historical data layers, each data layer representing at least one geological characteristic of the subsurface comprising: identifying one or more user data layers provided by a user; and generating a graphical representation of the at least partially global subsurface model for display at a user interface and displaying the user data layers in the user interface with the at least partially global subsurface model.

22. The apparatus of claim 21, wherein the geoscience data comprises at least one of: seismic data; wireline logs; drill core data; construction permitting documents; production logs; soil surveys; or technical reports.

23. The apparatus of claim 22, wherein the technical reports comprise at least one of: a local or regional geologic study; a local or regional geophysical study; an earthquake derived crustal thickness map; or a site study for hydrology.

24. The apparatus of claim 21, wherein the remote sensing data comprises at least one of: satellite sensing data; aerial sensing data; or surficial sensing data.

25. The apparatus of claim 24, wherein the remote sensing data comprises at least one of: gravimetric data; soil type; magnetic field data; electromagnetic data; fiber arrays; infrared imaging; hyperspectral imaging; or teleseismic wavefield data.

26. The apparatus of claim 21, wherein the geological characteristics of the one or more data layers comprises at least one of: mineralogical composition; water content; metal abundance; fault or fracture boundary locations; porosity; density; volcanic activity; rock type; gamma radiation; neutron activity; sonic activity; resistivity; temperature, or grain or clast size.

27. The apparatus of claim 21, wherein the operations further comprise providing, via an application programming interface (API), a model representing the at least partially global subsurface model of the subsurface, wherein the model is presented in a plurality of adjustable data layers.

28. The apparatus of claim 21, wherein the at least partially global subsurface model comprises the inferred data and the geoscience data, and collectively forms a complete, global subsurface model of the Earth.

29. The apparatus of claim 21, wherein one or more data layers can be toggled between an active and an inactive state.

30. The apparatus of claim 21, wherein the operations further comprise in response to a user request, generating a hybrid data layer, wherein the hybrid data layer comprises a combination of data from one or more data layers, and wherein the hybrid data layer is generated pursuant to a desired configuration indicated in the user request.

31. The apparatus of claim 21, wherein the operations further comprise, in response to a user request, selection of an algorithm and a set of data layers, executing the algorithm on the set of data layers to provide an additional output data layer.

32. The apparatus of claim 21, wherein the operations further comprise:
receiving, from the user, a custom algorithm; and
executing the custom algorithm on one or more data layers to produce an additional output data layer.

33. The apparatus of claim 21, wherein the remote sensing data comprises imaging data that is tagged with information comprising at least one of: outcrop locations; vegetation type; vegetation species; or a topological overlay.

34. The apparatus of claim 21, wherein remote sensing data associated with the subsurface comprises a surficial model generated as a result of a machine learning process.

35. The apparatus of claim 21, wherein the at least partially global subsurface model comprises a continental subsurface model.

36. The apparatus of claim 21, wherein the at least partially global subsurface model comprises a global subsurface model.

37. An apparatus that comprises a non-transitory, computer-readable storage medium that comprises instructions that, when executed by at least one processor, cause the at least one processor to perform operations comprising:
identifying geoscience data associated with one or more particular regions of a subsurface, the geoscience data comprising information associated with the lithology of the one or more particular regions of the subsurface;
identifying remote sensing data associated with the subsurface;
correlating the geoscience data with the remote sensing data using at least one machine learning model to determine inferred data representing lithology of one or more regions of the subsurface associated with the remote sensing data where geoscience data is unavailable;
generating an at least partially global subsurface model of the subsurface comprising one or more data layers, each data layer representing at least one geological characteristic of the subsurface, wherein the one or more data layers can be toggled between an active and an inactive state;
identifying one or more user data layers provided by a user; and
generating a graphical representation of the at least partially global subsurface model for display at a user interface and displaying the user data layers in the user interface with the at least partially global subsurface model.

38. The apparatus of claim 37, wherein the geoscience data comprises at least one of: seismic data; wireline logs; drill core data; construction permitting documents; production logs; soil surveys; or technical reports.

39. The apparatus of claim 38, wherein the technical reports comprise at least one of: a local or regional geologic study; a local or regional geophysical study; an earthquake derived crustal thickness map; or a site study for hydrology.

40. The apparatus of claim 37, wherein the remote sensing data comprises at least one of: satellite sensing data; aerial sensing data; or surficial sensing data.

41. The apparatus of claim 40, wherein the remote sensing data comprises at least one of: gravimetric data; soil type; magnetic field data; electromagnetic data; fiber arrays; infrared imaging; hyperspectral imaging; or teleseismic wavefield data.

42. The apparatus of claim 37, wherein the geological characteristics of the one or more data layers comprises at least one of: mineralogical composition; water content; metal abundance; fault or fracture boundary locations; porosity; density; volcanic activity; rock type; gamma radiation; neutron activity; sonic activity; resistivity; temperature, or grain or clast size.

43. The apparatus of claim 37, wherein the operations further comprise providing, via an application programming interface (API), a model representing the at least partially global subsurface model of the subsurface, wherein the model is presented in a plurality of adjustable data layers.

44. The apparatus of claim 37, wherein the at least partially global subsurface model comprises the inferred data and the geoscience data, and collectively forms a complete, global subsurface model of the Earth.

45. The apparatus of claim 37, wherein the at least partially global subsurface model further comprises a repository of data layers arranged in a hierarchy, comprising at least one of: publicly shared user data layers; private user data layers; or historical data layers.

46. The apparatus of claim 37, wherein the operations further comprise in response to a user request, generating a hybrid data layer, wherein the hybrid data layer comprises a combination of data from one or more data layers, and wherein the hybrid data layer is generated pursuant to a desired configuration indicated in the user request.

47. The apparatus of claim 37, wherein the operations further comprise, in response to a user request, selection of an algorithm and a set of data layers, executing the algorithm on the set of data layers to provide an additional output data layer.

48. The apparatus of claim 37, wherein the operations further comprise:
receiving, from the user, a custom algorithm; and
executing the custom algorithm on one or more data layers to produce an additional output data layer.

49. The apparatus of claim 37, wherein the remote sensing data comprises imaging data that is tagged with information comprising at least one of: outcrop locations; vegetation type; vegetation species; or a topological overlay.

50. The apparatus of claim 37, wherein remote sensing data associated with the subsurface comprises a surficial model generated as a result of a machine learning process.

51. The apparatus of claim 37, wherein the at least partially global subsurface model comprises a continental subsurface model.

52. The apparatus of claim 37, wherein the at least partially global subsurface model comprises a global subsurface model.

53. An apparatus that comprises a non-transitory, computer-readable storage medium that comprises instructions that, when executed by at least one processor, cause the at least one processor to perform operations comprising:
identifying geoscience data associated with one or more particular regions of a subsurface, the geoscience data comprising information associated with the lithology of the one or more particular regions of the subsurface;

identifying remote sensing data associated with the subsurface;

correlating the geoscience data with the remote sensing data using at least one machine learning model to determine inferred data representing lithology of one or more regions of the subsurface associated with the remote sensing data where geoscience data is unavailable;

generating an at least partially global subsurface model of the subsurface comprising one or more data layers, each data layer representing at least one geological characteristic of the sub surface;

identifying one or more user data layers provided by a user;

generating a graphical representation of the at least partially global subsurface model for display at a user interface and displaying the user data layers in the user interface with the at least partially global subsurface model; and in response to a user request, generating a hybrid data layer, wherein the hybrid data layer comprises a combination of data from one or more data layers, and wherein the hybrid data layer is generated pursuant to a desired configuration indicated in the user request.

54. The apparatus of claim 53, wherein the geoscience data comprises at least one of: seismic data; wireline logs; drill core data; construction permitting documents; production logs; soil surveys; or technical reports.

55. The apparatus of claim 54, wherein the technical reports comprise at least one of: a local or regional geologic study; a local or regional geophysical study; an earthquake derived crustal thickness map; or a site study for hydrology.

56. The apparatus of claim 53, wherein the remote sensing data comprises at least one of: satellite sensing data; aerial sensing data; or surficial sensing data.

57. The apparatus of claim 56, wherein the remote sensing data comprises at least one of: gravimetric data; soil type; magnetic field data; electromagnetic data; fiber arrays; infrared imaging; hyperspectral imaging; or teleseismic wavefield data.

58. The apparatus of claim 53, wherein the geological characteristics of the one or more data layers comprises at least one of: mineralogical composition; water content; metal abundance; fault or fracture boundary locations; porosity; density; volcanic activity; rock type; gamma radiation; neutron activity; sonic activity; resistivity; temperature, or grain or clast size.

59. The apparatus of claim 53, wherein the operations further comprise providing, via an application programming interface (API), a model representing the at least partially global subsurface model of the subsurface, wherein the model is presented in a plurality of adjustable data layers.

60. The apparatus of claim 53, wherein the at least partially global subsurface model comprises the inferred data and the geoscience data, and collectively forms a complete, global subsurface model of the Earth.

61. The apparatus of claim 53, wherein the at least partially global subsurface model further comprises a repository of data layers arranged in a hierarchy, comprising at least one of: publicly shared user data layers; private user data layers; or historical data layers.

62. The apparatus of claim 53, wherein one or more data layers can be toggled between an active and an inactive state.

63. The apparatus of claim 53, wherein the operations further comprise, in response to a user request, selection of an algorithm and a set of data layers, executing the algorithm on the set of data layers to provide an additional output data layer.

64. The apparatus of claim 53, wherein the operations further comprise:

receiving, from the user, a custom algorithm; and executing the custom algorithm on one or more data layers to produce an additional output data layer.

65. The apparatus of claim 53, wherein the remote sensing data comprises imaging data that is tagged with information comprising at least one of: outcrop locations; vegetation type; vegetation species; or a topological overlay.

66. The apparatus of claim 53, wherein remote sensing data associated with the subsurface comprises a surficial model generated as a result of a machine learning process.

67. The apparatus of claim 53, wherein the at least partially global subsurface model comprises a continental subsurface model.

68. The apparatus of claim 53, wherein the at least partially global subsurface model comprises a global subsurface model.

69. An apparatus that comprises a non-transitory, computer-readable storage medium that comprises instructions that, when executed by at least one processor, cause the at least one processor to perform operations comprising:

identifying geoscience data associated with one or more particular regions of a subsurface, the geoscience data comprising information associated with the lithology of the one or more particular regions of the subsurface;

identifying remote sensing data associated with the subsurface;

correlating the geoscience data with the remote sensing data using at least one machine learning model to determine inferred data representing lithology of one or more regions of the subsurface associated with the remote sensing data where geoscience data is unavailable;

generating an at least partially global subsurface model of the subsurface comprising one or more data layers, each data layer representing at least one geological characteristic of the subsurface, wherein the at least partially global subsurface model comprises a global subsurface model; and generating a graphical representation of the at least partially global subsurface model for display at a user interface.

70. The apparatus of claim 69, wherein the geoscience data comprises at least one of: seismic data; wireline logs; drill core data; construction permitting documents; production logs; soil surveys; or technical reports.

71. The apparatus of claim 70, wherein the technical reports comprise at least one of: a local or regional geologic study; a local or regional geophysical study; an earthquake derived crustal thickness map; or a site study for hydrology.

72. The apparatus of claim 69, wherein the remote sensing data comprises at least one of: satellite sensing data; aerial sensing data; or surficial sensing data.

73. The apparatus of claim 72, wherein the remote sensing data comprises at least one of: gravimetric data; soil type; magnetic field data; electromagnetic data; fiber arrays; infrared imaging; hyperspectral imaging; or teleseismic wavefield data.

74. The apparatus of claim 69, wherein the geological characteristics of the one or more data layers comprises at least one of: mineralogical composition; water content; metal abundance; fault or fracture boundary locations;

porosity; density; volcanic activity; rock type; gamma radiation; neutron activity; sonic activity; resistivity; temperature, or grain or clast size.

75. The apparatus of claim 69, wherein the operations further comprise providing, via an application programming interface (API), a model representing the at least partially global subsurface model of the subsurface, wherein the model is presented in a plurality of adjustable data layers.

76. The apparatus of claim 69, wherein the at least partially global subsurface model comprises the inferred data and the geoscience data, and collectively forms a complete, global subsurface model of the Earth.

77. The apparatus of claim 69, wherein the operations further comprise:
   identifying one or more user data layers provided by a user; and
   displaying the user data layers in the user interface with the at least partially global subsurface model.

78. The apparatus of claim 77, wherein the at least partially global subsurface model further comprises a repository of data layers arranged in a hierarchy, comprising at least one of: publicly shared user data layers; private user data layers; or historical data layers.

79. The apparatus of claim 77, wherein one or more data layers can be toggled between an active and an inactive state.

80. The apparatus of claim 77, wherein the operations further comprise in response to a user request, generating a hybrid data layer, wherein the hybrid data layer comprises a combination of data from one or more data layers, and wherein the hybrid data layer is generated pursuant to a desired configuration indicated in the user request.

81. The apparatus of claim 77, wherein the operations further comprise, in response to a user request, selection of an algorithm and a set of data layers, executing the algorithm on the set of data layers to provide an additional output data layer.

82. The apparatus of claim 77, wherein the operations further comprise:
   receiving, from the user, a custom algorithm; and
   executing the custom algorithm on one or more data layers to produce an additional output data layer.

83. The apparatus of claim 69, wherein the remote sensing data comprises imaging data that is tagged with information comprising at least one of: outcrop locations; vegetation type; vegetation species; or a topological overlay.

84. The apparatus of claim 69, wherein remote sensing data associated with the subsurface comprises a surficial model generated as a result of a machine learning process.

85. The apparatus of claim 69, wherein the at least partially global subsurface model comprises a continental subsurface model.

* * * * *